(12) United States Patent
Mann

(10) Patent No.: US 9,649,705 B2
(45) Date of Patent: May 16, 2017

(54) SAW BLADE OR CUT-OFF WHEEL MADE OF MARTENSITIC STAINLESS STEEL OR STEEL

(71) Applicant: C. & E. Fein GmbH, Schwaebisch Gmuend-Bargau (DE)

(72) Inventor: Rainer Mann, Aalen (DE)

(73) Assignee: C. & E. Fein GmbH, Schwaebisch Gmuend-Bargau (DE)

( * ) Notice: Subject to any disclaimer, the term of this patent is extended or adjusted under 35 U.S.C. 154(b) by 92 days.

(21) Appl. No.: 13/913,560

(22) Filed: Jun. 10, 2013

(65) Prior Publication Data

US 2014/0017986 A1 Jan. 16, 2014

(30) Foreign Application Priority Data

Jul. 13, 2012 (DE) .................. 10 2012 106 351

(51) Int. Cl.
| | | |
|---|---|---|
| *B24D 5/12* | (2006.01) | |
| *B24D 18/00* | (2006.01) | |
| *B24D 3/06* | (2006.01) | |
| *B23D 61/02* | (2006.01) | |
| *B23D 65/00* | (2006.01) | |
| *B24B 23/04* | (2006.01) | |
| *B23D 61/00* | (2006.01) | |

(52) U.S. Cl.
CPC ......... *B23D 61/028* (2013.01); *B23D 61/006* (2013.01); *B23D 61/02* (2013.01); *B23D 65/00* (2013.01); *B24B 23/04* (2013.01); *B24D 3/06* (2013.01); *B24D 5/12* (2013.01); *B24D 18/00* (2013.01); *Y10T 83/9319* (2015.04)

(58) Field of Classification Search
CPC . B24D 3/06; B24D 5/12; B24D 18/00; B23D 61/02; B23D 61/026; B23D 61/028; B23D 61/006
USPC ................ 451/540, 541, 542, 544, 546, 547
See application file for complete search history.

(56) References Cited

U.S. PATENT DOCUMENTS

| | | | | |
|---|---|---|---|---|
| 1,843,549 A | * | 2/1932 | Firth ................ | B23B 27/18 428/564 |
| 3,069,816 A | * | 12/1962 | Pratt ................ | B24D 5/123 125/15 |
| 3,372,464 A | * | 3/1968 | Vincent ............ | B23K 1/18 228/124.1 |
| 3,751,283 A | * | 8/1973 | Dawson ............ | C23C 24/103 228/122.1 |
| 3,820,419 A | * | 6/1974 | McLagen .......... | B23D 63/18 29/90.7 |
| 4,111,098 A | * | 9/1978 | Ainoura ............ | B23F 5/22 409/11 |
| 5,275,672 A | * | 1/1994 | Althaus ............ | C21D 6/04 148/325 |

(Continued)

FOREIGN PATENT DOCUMENTS

| | | |
|---|---|---|
| AT | 352 372 B | 9/1979 |
| AT | 411 441 B | 1/2004 |

(Continued)

*Primary Examiner* — Eileen Morgan
(74) *Attorney, Agent, or Firm* — Slater Matsil, LLP

(57) ABSTRACT

A saw blade or a cut-off wheel for an oscillating tool machine includes a base body, wherein the base body has a cutting area and the cutting area is coated with a granulated carbide, wherein the base body is formed in one piece and includes martensitic stainless steel and/or martensitic steel.

19 Claims, 2 Drawing Sheets

(56) References Cited

U.S. PATENT DOCUMENTS

| | | | | |
|---|---|---|---|---|
| 6,012,977 A | * | 1/2000 | Yoshikawa | B24D 5/12 |
| | | | | 125/15 |
| 6,189,584 B1 | * | 2/2001 | Cayce | B27G 13/04 |
| | | | | 144/218 |
| 6,375,762 B1 | | 4/2002 | Deimel | |
| 6,517,427 B1 | * | 2/2003 | Yoshikawa | B28D 5/029 |
| | | | | 451/544 |
| 6,633,739 B2 | * | 10/2003 | White | G03G 21/0035 |
| | | | | 399/350 |
| 6,861,161 B2 | | 3/2005 | Ponemayr et al. | |
| 2003/0113146 A1 | * | 6/2003 | White | G03G 21/0035 |
| | | | | 399/353 |
| 2006/0118215 A1 | * | 6/2006 | Hirakawa | C21D 6/004 |
| | | | | 148/607 |
| 2013/0014395 A1 | * | 1/2013 | Patel et al. | 30/346.54 |
| 2013/0014396 A1 | * | 1/2013 | Skrobis et al. | 30/346.54 |
| 2013/0331013 A1 | * | 12/2013 | Neal et al. | 451/461 |
| 2014/0000467 A1 | * | 1/2014 | Lunnerfjord | 101/335 |

FOREIGN PATENT DOCUMENTS

| | | |
|---|---|---|
| DE | 2 83 160 A5 | 10/1990 |
| DE | 295 10 690 U1 | 9/1995 |
| DE | 197 44 512 A1 | 4/1999 |
| EP | 0 751 234 A1 | 1/1997 |
| GB | 1513667 A * | 6/1978 |
| JP | 01316123 A * | 12/1989 |
| JP | 2006037173 A * | 2/2006 |

* cited by examiner

SAW BLADE OR CUT-OFF WHEEL MADE OF MARTENSITIC STAINLESS STEEL OR STEEL

CROSS REFERENCE TO RELATED APPLICATIONS

Applicant claims priority under 35 U.S.C. §119 of German Application No. 10 2012 106 351.6 filed Jul. 13, 2012, the disclosure of which is incorporated by reference.

FIELD OF THE INVENTION

The present invention relates to a saw blade or a cut-off wheel for an oscillating tool and a method for manufacturing a saw blade or a cut-off wheel.

BACKGROUND OF THE INVENTION

In the state of the art saw blades or cut-off wheels are known, which can be mounted to an oscillating tool machine.

SUMMARY OF THE INVENTION

Applying a coat of granulated carbide to a base body requires high temperatures, which lead to a softening of the base body and thus to an undesirable deformation. In order to prevent this, a complex production process is necessary.

One object is therefore to provide a saw blade or a cut-off wheel, which has a coat of granulated carbide and yet is simple and thus cost-efficient to produce.

As a first embodiment of the invention a saw blade or a cut-off wheel for an oscillating tool machine is provided, comprising a base body, wherein the base body has a cutting area and said cutting area is coated with a granulated carbide, wherein the base body is formed in one piece and comprises martensitic stainless steel and/or martensitic steel.

By the use of a base body with corresponding stainless steel/steel, in only one heating and cooling process, at the same time the granulated carbide can be soldered to the base body and a hardening of the base body can be achieved. The cooling process, which is necessary anyway after soldering, which cools slower than the common quenching for hardening usual steels, is sufficient for achieving the required hardness. Hardening in a separate process step can therefore be eliminated.

As a second embodiment of the invention a method for producing the saw blade or the cut-off wheel is provided, comprising the steps: producing a base body with a cutting area made of stainless steel and/or steel, applying a solder paste to the cutting area, applying a granulated carbide to the cutting area, heating with a temperature and subsequent cooling, wherein the stainless steel transforms to martensitic stainless steel and/or the steel transforms to martensitic steel.

Exemplary embodiments are described below.

According to an exemplary embodiment of the invention a saw blade or a cut-off wheel is provided, wherein the saw blade or the cut-off wheel consists of martensitic stainless steel and/or martensitic steel.

In a further exemplary embodiment a saw blade or a cut-off wheel is provided, wherein the stainless steel and/or steel comprises 12% to 18% Chromium (Cr) and more than 0.1% Carbon (C).

If the stainless steel and/or the steel comprises 12% to 18% Chromium (Cr) and more than 0.1% Carbon (C), after soldering and cooling a hardened base body with a long service life can be assumed.

According to an exemplary embodiment of the invention a saw blade or a cut-off wheel is provided, wherein the base body has a hardness of approximately 450 HV.

In case of a hardness of approx. 450 HV of the tool body, a long service life of the saw blade, the cut-off wheel can be assumed.

According to a further exemplary embodiment of the present invention a saw blade or a cut-off wheel is provided, wherein the base body is pickled and/or ground and/or polished.

By pickling and/or grinding and/or polishing the base body, corrosion resistance of the base body can be further increased.

According to a further exemplary embodiment of the present invention a saw blade or a cut-off wheel is provided, wherein the production of the base body is a deep drawing process and/or wherein the temperature during soldering is in the range of 950° C. to 110° C. and/or wherein the temperature during soldering is approximately or greater than 100° C.

By the use of a deep drawing process the base body can be formed in one piece, which speeds up manufacturing of the saw blade or cut-off wheel.

According to a further exemplary embodiment of the present invention a method is provided, wherein the solder paste is a copper alloy or a copper-tin alloy.

In a further embodiment according to the invention a method is provided, wherein the heating occurs in a vacuum furnace or in a continuous shielding gas furnace.

By using a vacuum furnace or a continuous shielding gas furnace, the saw blade can be manufactured easily.

According to an exemplary embodiment of the invention a method is provided, wherein after soldering and cooling the base body has a hardness of approximately 450 HV.

In case of a hardness of approx. 450 HV of the base body a long service life can be assumed.

It can be considered an idea of the invention to provide a saw blade or a cut-off wheel for an oscillating tool, which has on its cutting area a carbide coating and whose base body is a martensitic stainless steel and/or a martensitic steel (for example X20Cr13). Martensitic stainless steels or martensitic steels can be obtained from stainless steels or steels with 12% to 18% Chromium and a Carbon content of more than 0.1% and are austenitic at temperatures above 950° C. to 1050° C. Fast cooling/quenching leads to formation of a martensitic structure. This structure has particularly after quenching and tempering a high strength, which increases further with increasing C-content. A suitable surface finish is a requirement for sufficient corrosion resistance, which can for example be achieved by pickling, grinding or polishing. According to the invention to the cutting area of a carrier body/base body with appropriate stainless steel/steel a copper or copper-tin solder alloy is applied and then covered/sprinkled with granulated carbide. After that the carrier body with the granulated carbide is heated in a vacuum furnace or in a continuous shielding gas furnace, wherein a soldering temperature of approx. 1100° C. is reached. After that cooling follows with slower cooling speed compared to usual hardening processes, wherein this cooling speed is given by the automated soldering process, i.e. it would also be necessary if no hardening of the base material were desired. Through this the base body receives a hardness of for example 450 HV, wherein with the appropriate cooling speeds an additional increase of the hardness would be possible. It is of advantage in this case, that also big saw blades can be provided with a high mechanical stability and thus the risk of deformation or bending out of shape during an additional hardening process is largely eliminated. Furthermore is not necessary anymore to implement the base body as two pieces, because the base body cannot soften at the soldering temperature of approx. 1100° C. This allows for a simple manufacturing method. Furthermore the base bodies are also hard in the area of the drive mounting. An "inside deforming" of the saw blade by the drive of the tool is eliminated through this.

The individual features can of course be combined with each other, which may in part have advantageous effects exceeding the sum of individual effects.

BRIEF DESCRIPTION OF THE DRAWINGS

Further details and benefits of the invention are made clear on the basis of the exemplary embodiments shown in the drawings. There is shown by FIG. 1 a saw blade or cut-off wheel for an oscillating tool machine, FIG. 2 the saw blade or cut-off wheel in a longitudinal section, FIG. 3 the detail X of the saw blade or cut-off wheel in a longitudinal section, FIG. 4 a further saw blade or cut-off wheel for an oscillating tool machine, FIG. 5 the saw blade or cut-off wheel in a longitudinal section, FIG. 6 the detail Y of the saw blade or cut-off wheel in a longitudinal section.

DETAILED DESCRIPTION OF EXEMPLARY EMBODIMENTS

Figure 1:
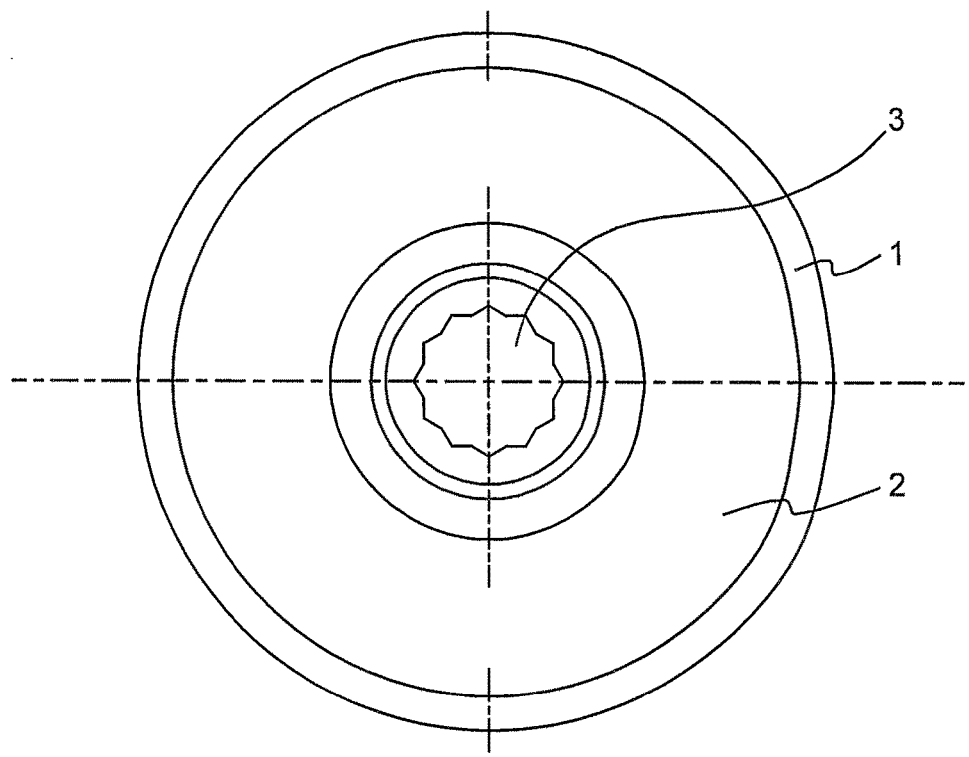

FIG. 1 shows a saw blade or cut-off wheel with a mount opening 3 for mounting the saw blade to an oscillating tool machine. The saw blade or cu-off wheel comprises a base body 2, which can be deep drawn in one piece and have a rim 1. The rim 1 is a cutting area and has a coating of granulated carbide. As a base body 2 martensitic steel and/or martensitic stainless steel is used, which has a hardening temperature approximately matching the temperature necessary for soldering the granulated carbide 1 onto the base body 2. Thus by means of a single heating and cooling process the base body can be hardened as well as its service life increased as well as granulated carbide soldered onto the base body. Because of this the manufacturing process can be sped up and simplified.

Figure 2:
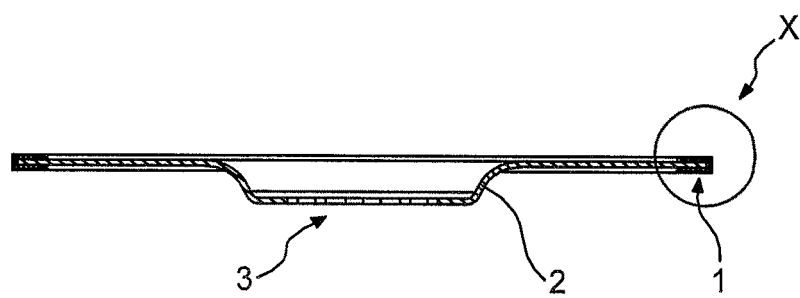

FIG. 2 shows the saw blade or cut-off wheel in a longitudinal section with the base body 2.

Figure 3:
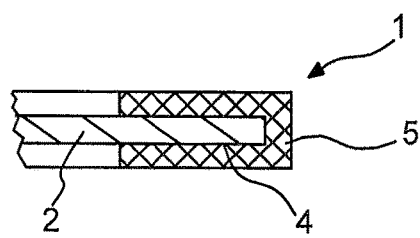

FIG. 3 shows detail X of FIG. 2 with the base body 2 and the rim/cutting area 1, wherein the cutting area 1 has a coating of granulated carbide 5. The granulated carbide 5 can be joined/soldered to the base body 2 by a solder/solder paste 4 comprising/consisting of for example a copper or copper-tin alloy. In order to obtain a martensitic stainless steel/a martensitic steel, a hardening temperature of approximately 950° C. to 1050° C. is required. Other steel has for example a hardening temperature of approx. 800° C. The soldering temperature to liquefy the solder and to join the carbide to the base body 2 is approx. 1100° C. At such high temperatures usual steel would thus already soften. In order to harden usual steel, after the heating a cooling with a very high cooling speed, a quenching, would have to take place.

Stainless steel/steel selected according to the invention however becomes austenitic at such temperatures, and after cooling, even after cooling in air, the stainless steel/steel selected according to the invention becomes martensitic and therefore hard. Thus with stainless steel/steel selected according to the invention in only one process the base body 2 can be hardened as well as the granulated carbide be soldered to the base body 2.

Figure 4:
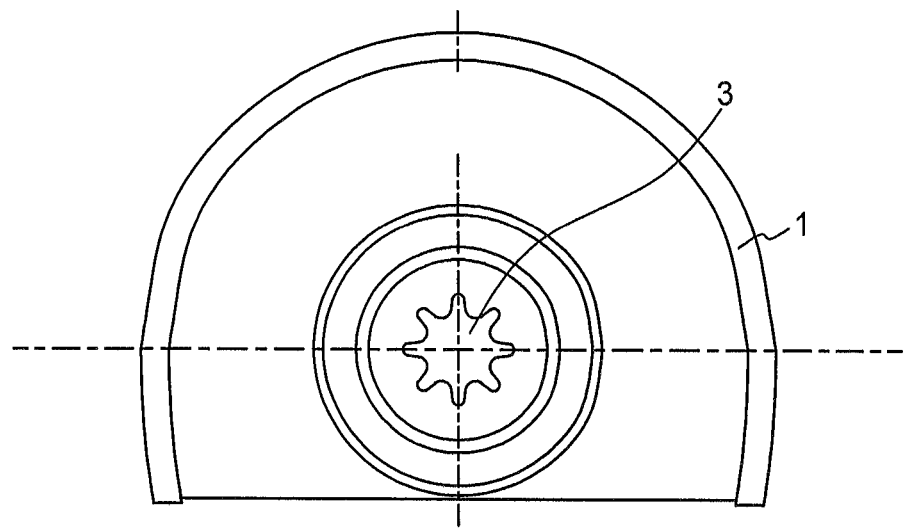

FIG. 4 shows a further saw blade or cut-off wheel with a mount opening 3 and a rim 1, wherein the rim 1 can be provided with granulated carbide.

Figure 5:
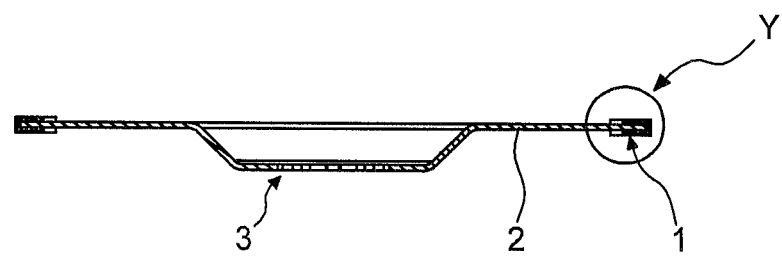

FIG. 5 shows in a longitudinal section the saw blade or cut-off wheel with the base body 2 and the rim/cutting area 1 with a coating of granulated carbide.

Figure 6:
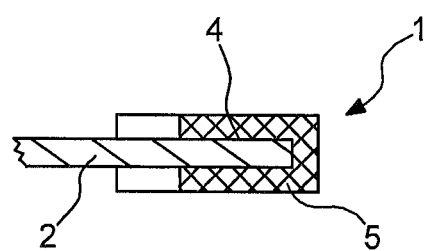

FIG. 6 shows detail Y of FIG. 5 with the base body 2 and the rim/cutting area 1 with a coating of granulated carbide 5, wherein the granulated carbide 5 can be joined/soldered to the base body 2 by means of a solder/solder paste 4.

It shall be mentioned that the term "comprise" does not preclude further items or process steps, as well as the term "a" and "an" does not preclude multiple items and steps.

The reference numerals used only serve to increase comprehensibility and should in no way be considered limiting, whereas the scope of protection of the invention is represented by the claims.

LIST OF REFERENCE NUMERALS 1 rim/cutting area
2 base body
3 mount opening for mounting to an oscillating tool
4 solder paste, particularly copper or copper-tin alloy
5 coat of granulated carbide

What is claimed is:

1. A circular saw blade or a cut-off wheel for a tool machine, the saw blade or the cut-off wheel comprising:
  a base body, wherein the base body has a cutting area, and wherein the base body is formed in one piece and comprises martensitic stainless steel and/or martensitic steel that was transformed from stainless steel and/or steel during a hardening process; and
  a granulated carbide coating disposed on the cutting area, wherein the granulated carbide coating is soldered to the base body and the base body is hardened in only one single soldering and hardening process comprising heating and subsequent cooling so that the saw blade or the cut-off wheel comprises substantially no distortion.

2. The saw blade or the cut-off wheel according to claim 1, wherein the saw blade or the cut-off wheel essentially consists of martensitic stainless steel and/or martensitic steel.

3. The saw blade or the cut-off wheel according to claim 1, wherein the stainless steel and/or steel comprises 12% to 18% Chromium (Cr) and more than 0.1% Carbon (C).

4. The saw blade or the cut-off wheel according to claim 1, wherein the base body has a hardness of approximately 450 HV.

5. The saw blade or the cut-off wheel according to claim 1, wherein the base body is pickled, ground and/or polished.

6. The saw blade or the cut-off wheel according to claim 1, wherein a solder layer comprises a copper alloy solder.

7. The saw blade or the cut-off wheel according to claim 1, wherein a solder layer comprises a copper-tin alloy solder.

8. The saw blade or the cut-off wheel according to claim 1, wherein the base body comprises a first main surface, a second main surface and a rim connecting the first main surface and the second main surface, and wherein the granulated carbide coating covers the entire rim.

9. The saw blade or the cut-off wheel according to claim 8, wherein the granulated carbide coating further covers portions of the first and second main surfaces.

10. The saw blade or the cut-off wheel according to claim 9, wherein the granulated carbide coating covers a first distance of the first main surface from the rim to a center of the first main surface and a second distance of the second main surface from the rim to a center of the second main surface, and wherein the first distance and the second distance are the same.

11. A method for producing a circular saw blade or a cut-off wheel, the method comprising:
    providing a base body made of stainless steel and/or steel, the base body having a cutting area;
    applying a solder paste to the cutting area;
    applying a granulated carbide coating on the solder paste; and
    soldering the granulated carbide coating to the base body and hardening the base body in one single process comprising heating and subsequent cooling,
    wherein hardening comprises transforming the stainless steel to martensitic stainless steel and/or the steel to martensitic steel.

12. The method according to claim 11, wherein, the solder paste is a copper alloy or a copper-tin alloy.

13. The method according to claim 11, wherein, heating occurs in a vacuum furnace or in a continuous shielding gas furnace.

14. The method according to claim 11, wherein, after soldering and cooling, the base body has a hardness of approximately 450 HV.

15. The method according to claim 11, wherein producing the base body comprises a deep drawing process.

16. The method according to claim 11, wherein heating comprises applying a temperature in a range of 950° C. to 1150° C.

17. The method according to claim 11, wherein heating comprises applying a temperature of approximately or greater than 1100° C.

18. The method according to claim 11, wherein applying the granulated carbide coating to the cutting area comprises sprinkling the granulated carbide on the cutting area.

19. A method for producing a circular saw blade or a cut-off wheel, the method comprising:
    producing a base body made of stainless steel and/or steel, the base body having a cutting area;
    applying a copper alloy or copper-tin alloy solder paste to the cutting area;
    applying a granulated carbide coating on the solder paste; and
    soldering the granulated carbide coating to the base body and hardening the base body in one single process comprising heating at a temperature in a range of 950° C. to 1150° C. and subsequent cooling,
    wherein hardening comprises transforming the stainless steel to martensitic stainless steel and/or the steel to martensitic steel.

* * * * *